US008389924B2

(12) United States Patent
Stromberg et al.

(10) Patent No.: US 8,389,924 B2
(45) Date of Patent: *Mar. 5, 2013

(54) DETECTOR AND OPTICAL SYSTEM

(75) Inventors: Juan Sebastian H. Stromberg, Moorgate Grove/Rotherham (GB); Craig Leivers, Woodborough/Nottigham (GB)

(73) Assignee: Pyronix Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/242,122

(22) Filed: Sep. 23, 2011

(65) Prior Publication Data

US 2012/0098661 A1 Apr. 26, 2012

Related U.S. Application Data

(63) Continuation of application No. 11/886,042, filed as application No. PCT/GB2006/000325 on Feb. 1, 2006, now Pat. No. 8,044,336.

(60) Provisional application No. 60/660,221, filed on Mar. 10, 2005.

(30) Foreign Application Priority Data

| | | |
|---|---|---|
| Mar. 10, 2005 | (GB) | 0504906.9 |
| Mar. 11, 2005 | (GB) | 0504999.4 |
| Nov. 3, 2005 | (GB) | 0522463.9 |

(51) Int. Cl.

| | |
|---|---|
| ***H01J 3/14*** | (2006.01) |
| ***G06M 7/00*** | (2006.01) |
| ***G02B 3/08*** | (2006.01) |

(52) U.S. Cl. .......................... 250/216; 250/221; 359/741

(58) Field of Classification Search .................. 250/216, 250/342, 349, 353, 208.1, 221; 359/741–743, 359/630–633, 737; 340/567, 541

See application file for complete search history.

(56) References Cited

U.S. PATENT DOCUMENTS

| | | | | |
|---|---|---|---|---|
| 3,703,718 | A | 11/1972 | Berman | |
| 3,725,888 | A | 4/1973 | Solomon | |
| 3,761,184 | A | 9/1973 | McLaughlin, Jr. | |
| 3,958,118 | A * | 5/1976 | Schwarz | 250/221 |
| 4,401,976 | A | 8/1983 | Stadelmayr | |
| 4,833,450 | A | 5/1989 | Buccola et al. | |
| 5,296,707 | A | 3/1994 | Nozu | |
| 5,298,969 | A * | 3/1994 | Cheung | 356/340 |
| 5,890,085 | A | 3/1999 | Corrado et al. | |
| 5,936,666 | A | 8/1999 | Davis | |
| 6,215,399 | B1 | 4/2001 | Shpater | |
| 6,351,234 | B1 * | 2/2002 | Choy | 342/53 |
| 8,044,336 | B2 * | 10/2011 | Stromberg et al. | 250/216 |

FOREIGN PATENT DOCUMENTS

| | | |
|---|---|---|
| GB | 1335410 | 10/1973 |

* cited by examiner

*Primary Examiner* — Georgia Y Epps
*Assistant Examiner* — Don Williams
(74) *Attorney, Agent, or Firm* — Wilmer Cutler Pickering Hale & Dorr LLP.

(57) ABSTRACT

Embodiments of the present invention relate to a detector comprising first and second lenses for use with respective first and second sensing means; each lens comprising a plurality of Fresnel facets having respective fields of view adapted such that the fields of view of the first lens are alternately arranged with the fields of view of the second lens such that the fields of view of the first lens are adjacent only to, but do not overlap with, the fields of view of the second lense in a single direction.

15 Claims, 17 Drawing Sheets

DETECTOR AND OPTICAL SYSTEM

FIELD OF THE INVENTION

The invention relates to a detector and optical system for such a detector.

BACKGROUND TO THE INVENTION

Detection apparatuses, for example, intrusion monitoring apparatuses, are well known within the art. Typically, they are used to detect unauthorised entry or intrusion into a protected volume.

Commercially available intrusion monitoring apparatuses can be either passive or active. Passive intrusion monitoring apparatuses can comprise a sensor which detects infrared radiation emitted by people. Typically, such passive apparatuses comprise a thermal detection apparatus consisting of one or more thermal sensors arranged to detect infrared radiation and an optical system for directing such infrared radiation towards the thermal sensors. The optical system comprises at least one lens formed from a plurality of Fresnel lenses or at least portions thereof. Each Fresnel lens of the plurality of lenses is typically known as a facet. Conventionally, facets view or monitor respective regions or angular sectors of the protected volume. Such apparatuses are activated when a source of infrared radiation passes from one region or angular sector to the next, that is, infrared radiation is detected in a plurality of angular sectors. Typical prior art intrusion monitoring apparatuses are illustrated in, for example, U.S. Pat. Nos. 3,703,718 and 3,958,118 and UK patent application number 1,335,410, the entire disclosures of which are incorporated herein by reference for all purposes.

Active intrusion monitoring apparatuses are also known which comprise a transmitter and a receiver. The transmitter emits radiation at a defined frequency and the receiver measures the Doppler shift in any reflected signal. Such active monitoring apparatuses can, for example, operate at microwave frequencies using a microwave detection apparatus to detect the reflected signal.

The above active and passive detection apparatuses can be used alone or in conjunction with one another. Apparatuses that use two or more technologies, that is, a passive detection technology and an active detection technology, to identify intrusion into a protected volume or, more particularly, movement of an intruder within the field of view of the apparatus, are known within the art as combined detectors, combined technology apparatuses, dual technology or multi-technology devices. Examples of combined detectors that use a photoelectric sensor and a microwave sensor are disclosed in U.S. Pat. Nos. 3,725,888 and 4,401,976, the entire disclosures of which are incorporated herein for all purposes by reference. There exists a British standard relating to combined passive infrared and microwave detectors, which is "*Alarm systems—Intrusion systems—Part* 2-4: *Requirements for combined passive infrared and microwave detectors*", the content of which is incorporated herein by reference for all purposes.

However, the revised DD243-2004 standard, entitled "*Installation and configuration of intruder alarm systems designed to generate confirmed alarm conditions—Code of practice*", under section 5.4, entitled "*Design and configuration of sequential confirmation IASs*", provides that within a sequentially confirmed alarm the movement detectors are not allowed to overlap each other. Furthermore, section 5.4.2 states that "[*therefore*], *movement detectors should be located some distance apart, generally with a minimum distance between detector housings of* 2.5 *m*". One skilled in the art clearly appreciates that the above is a costly solution to the problem of providing sequentially confirmed alarms since it requires twice the investment, that is, two detectors, twice the cabling etc.

In one typical combined technology device the outputs of two independent sensing means, that is, the photoelectric sensor and the microwave sensor, responding to different stimuli, must be present within a predetermined period of time to register an event, that is, intrusion by an intruder into the field of view or fields of view of the combined technology apparatus.

The European Committee for Electrotechnical Standardisation is responsible, amongst other things, for establishing technical standards relating to intrusion detection or detection apparatuses. For example, technical specification CLC/TS 50131-2-4:2004, entitled "Alarm systems—Intrusion Part 2-4: Requirements for combined passive infrared and microwave detectors", establishes a base or minimum set of standards or tests to be achieved by microwave detectors. The microwave detectors are given a corresponding grade according to the number or level of tests they pass, that is, according to the degree to which they correspond to the technical specifications or the specifications established by the class of 50131 standards. The above technical specifications are incorporated, for all purposes, herein by reference. The technical specifications provide for a number of security grades; namely, security grades 1 to 4. A requirement of EN 50131-1:1997 is that grade 3 and 4 systems shall have detectors that are able to detect a significant reduction in range. It will be appreciated that EN 50131-2-4:2004 applies to grade 4 detectors only. A simulated walk test is used to determine whether or not a detector is worthy of a corresponding grade. Typically, when assessing detector performance, a detector should generate an intrusion signal or message when an SWT or simulated walk test target moves within and across the detector's claimed boundary of detection for a distance of 3 meters. The detector shall also generate an intrusion signal or message when the standard or simulated walk test target moves at velocities and attitudes that meet the requirements specified of the technical standard CLC/TS 50131-2-4:2004. It can be appreciated from section 4.2.3 of that standard that the requirement headed "Significant reduction of specified range" is such that grade ¾ detectors should be capable of detecting "a range reduction along [a] principal axis of detection of more than 50% within a maximum period of 180s according to the requirements of Table 2". It will be appreciated that range reduction is discussed with reference to figure C.5 of that standard. Furthermore, it is indicated that the requirements of 4.3.5 (self test) and 4.5.5 (resistance to masking) can provide range reduction detection. Section 6.4.5, entitled "Verify the significant reduction of specified range" specifies a test to be met in determining whether or not a detector can detect a significant reduction of a specified range according to the technical specification. The test is as follows. A test point on a detector axis at a distance of 55% of the manufacturer's claimed detection range is selected. A barrier of cardboard boxes is erected across the axis such that it is normal, that is, perpendicular, to it at a distance of 45% of the manufacturer's claimed detection range. The barrier is such that it covers a horizontal distance of plus and minus 2.5 meters either side of the axis and has a vertical height of 3 meters such as is shown in figure C.5 of the technical specification CLC/TS 50131-2-4-2004. At the test point, two test directions are used, beginning at a distance of 1.5 meters before the test point, and finishing 1.5 meters after it, moving perpendicularly to the detector axis. The SWT shall move along each path from start to finish. At the end of each walk test, the SWT shall pause for at least 20 seconds before carrying out any further tests. The pass/fail criterion is such that an alarm or fault signal or message is generated when the barrier is present. It will be appreciated that a corresponding standard also prescribes requirements for passive infrared detectors; namely, DD CLC/TS 50131-2-2:2004.

In a further typical combined technology event detection device, the outputs of two independent sensing means, responding to different physical stimuli, are processed to determine if both sensing means register an event within a specified period of time, and, if so, an alarm is triggered. In this manner the incidence of false alarms occurring when only a single sensor means is used can be greatly reduced.

A problem with both single and combined technology event detection devices is that if the detector is masked, for example, by tampering with the outer casing of the detector, or by placing a screen in front of the detector which will absorb the microwave signals emitted by the microwave device, or which will block infra red signals and prevent them from reaching the passive infra red sensor, the event detection device is rendered inoperable.

Attempts have been made to overcome this problem by providing the event detection device with a separate system comprising an infra red LED emitter and a detector which operate at a frequency range different from that of the passive infra red sensor. If an object is placed near the event detection device so as to mask the passive infra red sensor, the infra red LED/detector system will detect the presence of the object and cause an alarm to be triggered.

Such anti-masking system increase the expense of the device, and in some circumstances are ineffective, because it is still possible to mask all or part of the Fresnel lens associated with the passive infra red sensor without traversing the light beam from the infra red LED. Thus a skillful thief can mask the lens without activating the anti-masking system.

U.S. Pat. No. 4,833,450 discloses an event detection which the alarm is sounded if a signal from a masking circuit exceeds a threshold level. The alarm continues to sound for a predetermined period. Once the predetermined period has lapsed the correct of operation of the event detection device is confirmed, the alarm is reset.

It is an object of embodiments to at least mitigate some of the problems of the prior art.

SUMMARY OF INVENTION

Accordingly, a first aspect of embodiments of the present invention provides a detector comprising first and second lenses for use with respective first and second sensing means; each lens comprising a plurality of Fresnel facets having respective fields of view adapted such that the fields of view of the first lens are alternately arranged with the fields of view of the second lens such that the fields of view of the first lens are adjacent only to, but do not overlap with, the fields of view of the second lens in a single direction.

Advantageously, a detector can be realised that uses optically separate fields of view.

A second aspect provides an optical arrangement comprising a plurality of Fresnel lenses or Fresnel facets forming first and second sets of fields of view; the first set of fields of view being alternately disposed relative to the second set of fields of view such that the fields of view of the first set are adjacent only to, but do not overlap with, the fields of view of the second set in a first direction.

Certain embodiments of the present invention include anti-masking capability, such that the detector will indicate a masking condition if the device has been tampered with or is defective, or has been accidentally or deliberately masked.

Certain embodiments of the present invention include a reduction range or blocking detection apparatus comprising means, responsive to at least a first input signal from at least one of the sensing means, to generate a blocking detection signal after a first period of time unless a second input signal is received within the first period of time from at least one of the sensing means. Advantageously, blocking detection can be realised, that is, a security system can be realised that can detect when the fields of view of the detectors of the system are obscured.

Other aspects of embodiments of the present invention are defined in the claims.

BRIEF DESCRIPTION OF THE DRAWINGS

Embodiments of the present invention will now be described, by way of example only, with reference to the accompanying drawings in which.

DETAILED DESCRIPTION OF EMBODIMENTS

Figure 1:
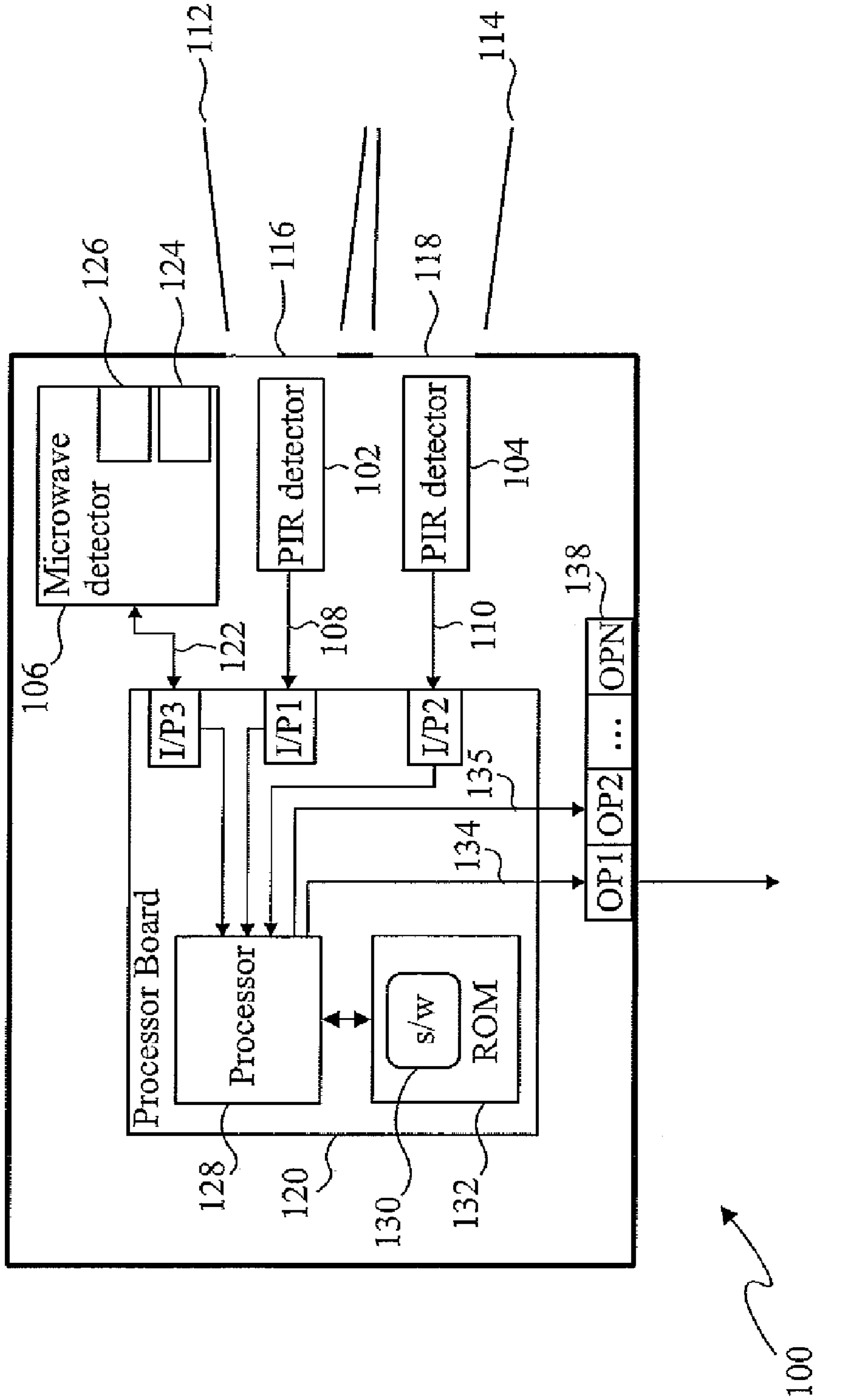
FIG. 1 shows a combined detector according to an embodiment.

Referring to FIG. 1, there is schematically shown a first embodiment of a combined detector 100 comprising first and second sensing means in the form of a pair of passive infrared (PIR) detectors 102 and 104 respectively, and a third sensing means in the form of a microwave detector 106 for use as part of an intrusion detection system (not shown). The combined detector 100 is arranged to detect a relatively broad spectrum of infrared radiation emitted by an intruder and, substantially simultaneously, to emit microwave radiation into a protected volume and to analyse any returned or reflected signals such that an intrusion signal or message is generated when both technologies provide an indication of the presence of an intruder.

The PIR detectors 102 and 104 generate outputs 108 and 110 in response to receiving infrared radiation emitted by an intruder, that is, in response to an intruder entering the fields of view 112 and 114 of respective lenses 116 and 118 associated with the PIR detectors. It will be appreciated that the fields of view 112 and 114 are merely schematically depicted. The outputs 108 and 110 from the pair of PIR detectors 102 and 104 are fed to respective inputs IP1 and IP2 of a processor or circuit board 120 for further processing.

The microwave detector 106 is a Doppler shift microwave detector that produces an output signal 122 in response to receiving, at a receiver 124, an appropriately Doppler-shifted version of a signal transmitted via a microwave transmitter 126. The output 122 of the microwave detector 106 is also fed to an input IP3 of the processor board 120 for further processing.

It can be appreciated that any of the PIR detectors 102, 104 and microwave detector 106 may be replaced by any sensing means. The sensing means may comprise, for example, a PIR sensor, an active infra red (AIR) sensor, a microwave sensor, an ultrasonic sensor or a combination of two or more of these or other types of sensor. In a preferred embodiment, however, the first and second sensing means 102 and 104 are PIR detectors, and the third sensing means 106 is a microwave detector.

The processor board 120 comprises a processor 128 that is arranged to execute software 130 stored in a memory 132. The memory 132 comprises a ROM. The processor 128 processes the signals 108, 110 and 122 received from the detectors 102, 104 and 106 to determine whether or not there is an intruder within a protected volume. The processing undertaken by the processor will be described with reference to FIG. 9.

It can be appreciated that the software 130 can be supplied to the detector 100 in a number of ways. For example, as shown in FIG. 1, the software is supplied by including a ROM 132 storing the software. Alternatively, the software could be supplied as, for example, a flash memory, optical disk, magnetic disk or tape, or by a wired or wireless transmission. In certain embodiments the memory 132 (for example a ROM) could be programmable via an external connection (not shown) on the detector 100. Other ways of providing the software 130 to the detector 100 are also possible.

If the processing determines that an intruder is within the protected volume, the processor generates an alarm signal 134 or causes such an alarm signal to be generated. The alarm signal 134 is made available at a terminal or pair of terminals of a connector block 138, where it is output for further processing by, for example, a control panel of an intrusion detection system (not shown) or to an alarm for generating an alarm.

The connector block is also used to provide a predetermined voltage, such as, for example 3.6V or 5V, and ground power to the detector 100 to power the various components contained in it. Other signals such as, for example, a tamper signal or fault signal may also be output by the connector block according to the capabilities of the software executable by the processor.

Figure 2:
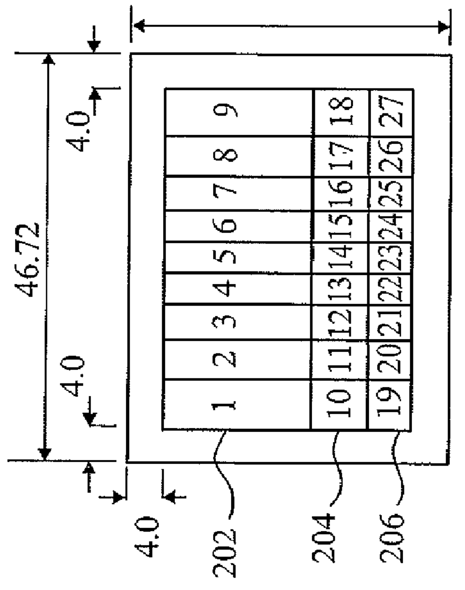
FIG. 2 illustrates a lens according to an embodiment.

FIG. 2 illustrates a lens 200 that can be used as the lenses 116 and 118. The lens 200 comprises a number of facets. In the embodiment illustrated, the lens has 27 facets. Each facet is, or selected facets are, shaped or profiled according to respective parts of a Fresnel lens master, which is described later with respect to FIG. 3. Each facet provides or comprises a respective field of view. The facets focus infrared radiation onto the PIR detectors 102 and 104.

The lens 200 comprises first 202, second 204 and third 206 rows of facets. The facets in the first row 202 have a common height and respective widths. In a preferred embodiment, the first row facets have a height of 17 mm. The facets in the second row 204 also have a common height. In a preferred embodiment, the height of the second row facets is 6.5 mm. The facets of the third row 206 have a common height. The third row facets have a height of 5 mm in a preferred embodiment. Table 1 below summarises the heights and widths of the facets of the lens 200. The facets are also known as segments within the art.

TABLE 1

| Segment/ Facet No. | X coordinate | Y coordinate | Width |
|---|---|---|---|
| 1 | 0.07 | 3.59 | 5.45 |
| 2 | −0.77 | 4.19 | 4.5 |
| 3 | −0.85 | 4.55 | 3.95 |
| 4 | −0.52 | 4.74 | 3.66 |
| 5 | 0 | 4.8 | 3.58 |
| 6 | 0.52 | 4.74 | 3.66 |
| 7 | 0.85 | 4.55 | 3.95 |
| 8 | 0.77 | 4.19 | 4.5 |
| 9 | −0.07 | 3.59 | 5.45 |
| 10 | 0.07 | 4.78 | 5.45 |
| 11 | −0.77 | 5.59 | 4.5 |
| 12 | −0.85 | 6.07 | 3.95 |
| 13 | −0.52 | 6.32 | 3.66 |
| 14 | 0 | 6.4 | 3.58 |
| 15 | 0.52 | 6.32 | 3.66 |
| 16 | 0.85 | 6.07 | 3.95 |
| 17 | 0.77 | 5.59 | 4.5 |
| 18 | −0.07 | 4.78 | 5.45 |
| 19 | 0.07 | 1.87 | 5.45 |
| 20 | −0.77 | 2.18 | 4.5 |
| 21 | −0.85 | 2.37 | 3.95 |
| 22 | −0.52 | 2.47 | 3.66 |
| 23 | 0 | 2.5 | 3.58 |
| 24 | 0.52 | 2.47 | 3.66 |
| 25 | 0.85 | 2.37 | 3.95 |
| 26 | 0.77 | 2.18 | 4.5 |
| 27 | −0.07 | 1.87 | 5.45 |

Figure 3:
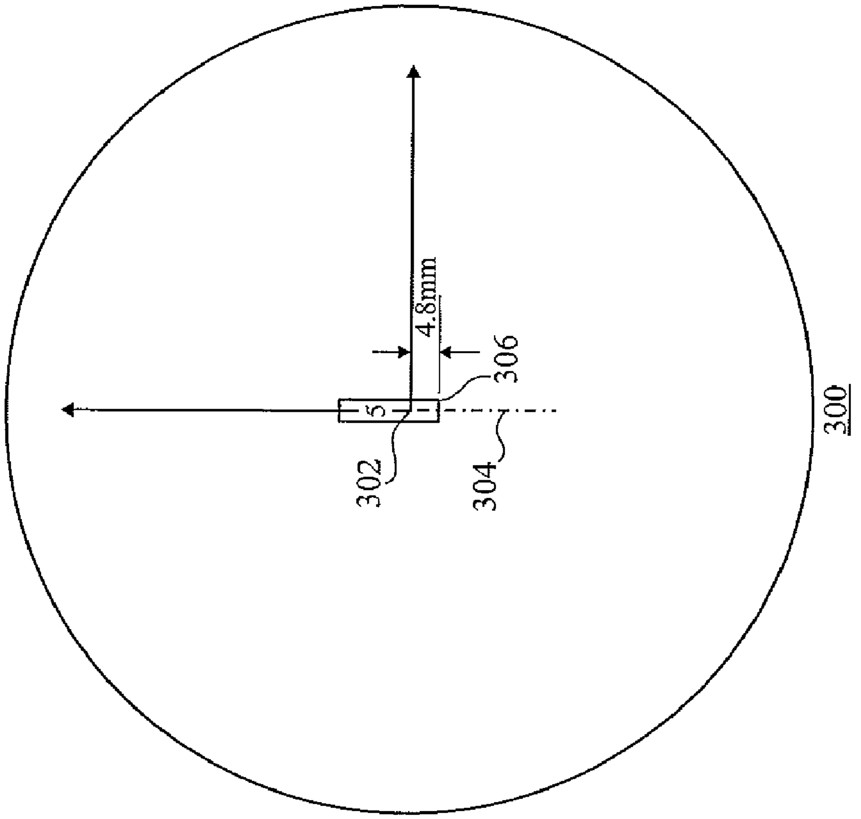
FIG. 3 depicts a Fresnel master for the lens described with reference to FIG. 2.

Also shown in table 1 are coordinate values. Each facet has a respective pair of coordinates. Referring to FIG. 3, there is shown schematically a Fresnel master 300 which has a centre 302. The coordinates of table 1 provide an indication of the position of the centre 302 of a respective copy of the Fresnel master relative to respective facets. The X coordinate describes the x-coordinate position of the centre of a respective Fresnel master 300 from a centre line (not shown) of a respective facet. The Y coordinate describes the y-coordinate position of the centre 302 of a respective Fresnel master 300 relative to the bottom edge of a respective facet. For example, FIG. 3 also shows the fifth facet. It can be appreciated that the x-coordinate of Fresnel master centre lies on the centre line 304 of the fifth facet. It can also be appreciated that the y-coordinate of the Fresnel master 300 is 4.8 mm above the bottom edge 306 of the fifth facet.

It will be recalled that the combined detector 100 comprises two such lenses 200. Therefore, one lens such as, for example, lens 116, will bear a first set of fields of view via its facets and the other lens 118 will bear a second set of fields of view via its facets. Each facet has a corresponding field of view.

Figure 4:
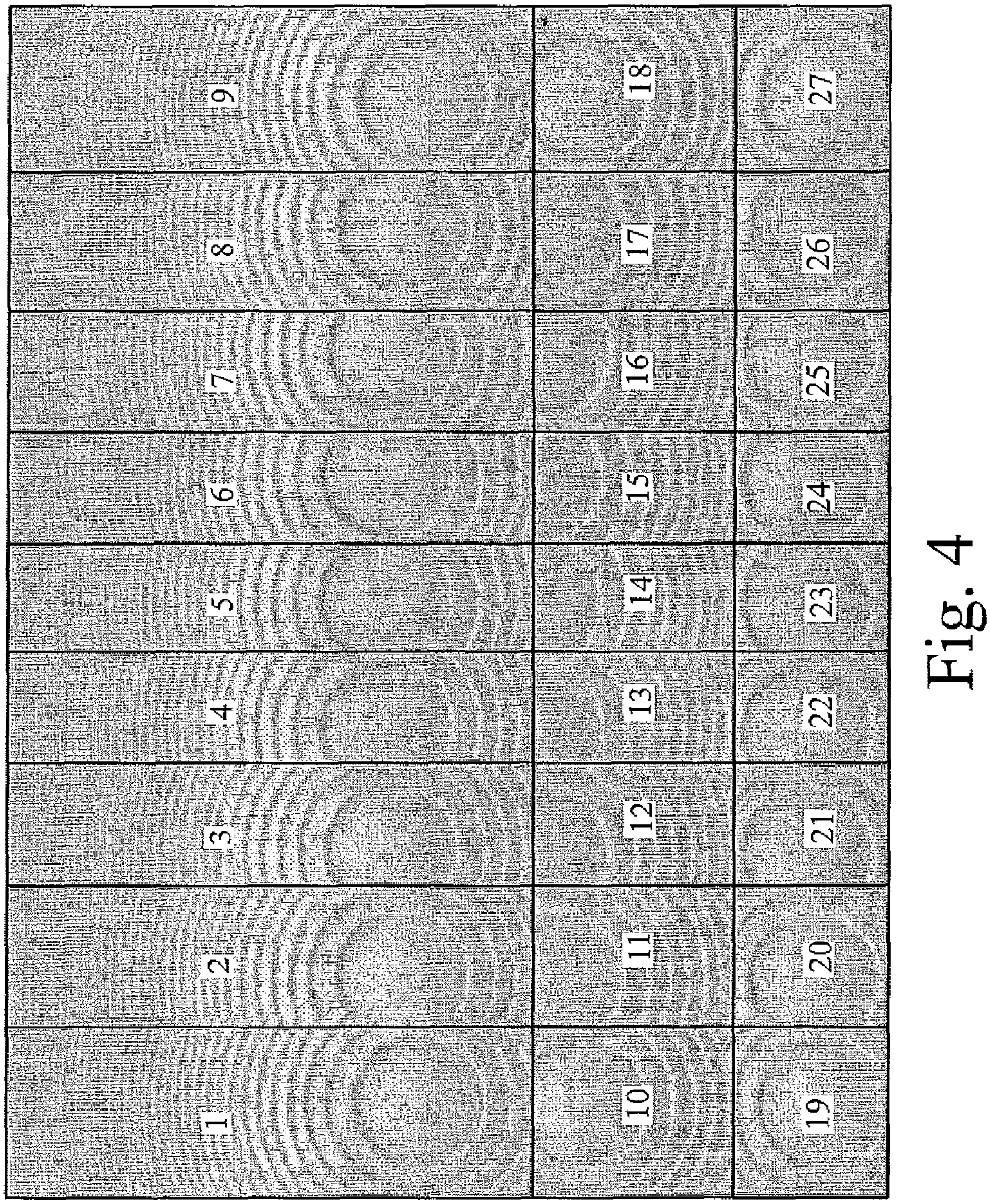
FIG. 4 shows a front view of a lens comprising a plurality of Fresnel facets.

Referring to FIG. 4, there is shown a lens 400, comprising a plurality of Fresnel facets, such as those described above in relation to and as shown in FIGS. 1 and 2. It can be appreciated that each facet 1 to 27 comprises a respective portion of the Fresnel master 300 positioned according to the data contained in table 1 above. It will be appreciated that embodiments can be realised in which a number of Fresnel masters are used to create the facets of the lens 400. For example, two, three, or more, different, Fresnel masters could be used to create the facets of the lens 400.

Figure 5:
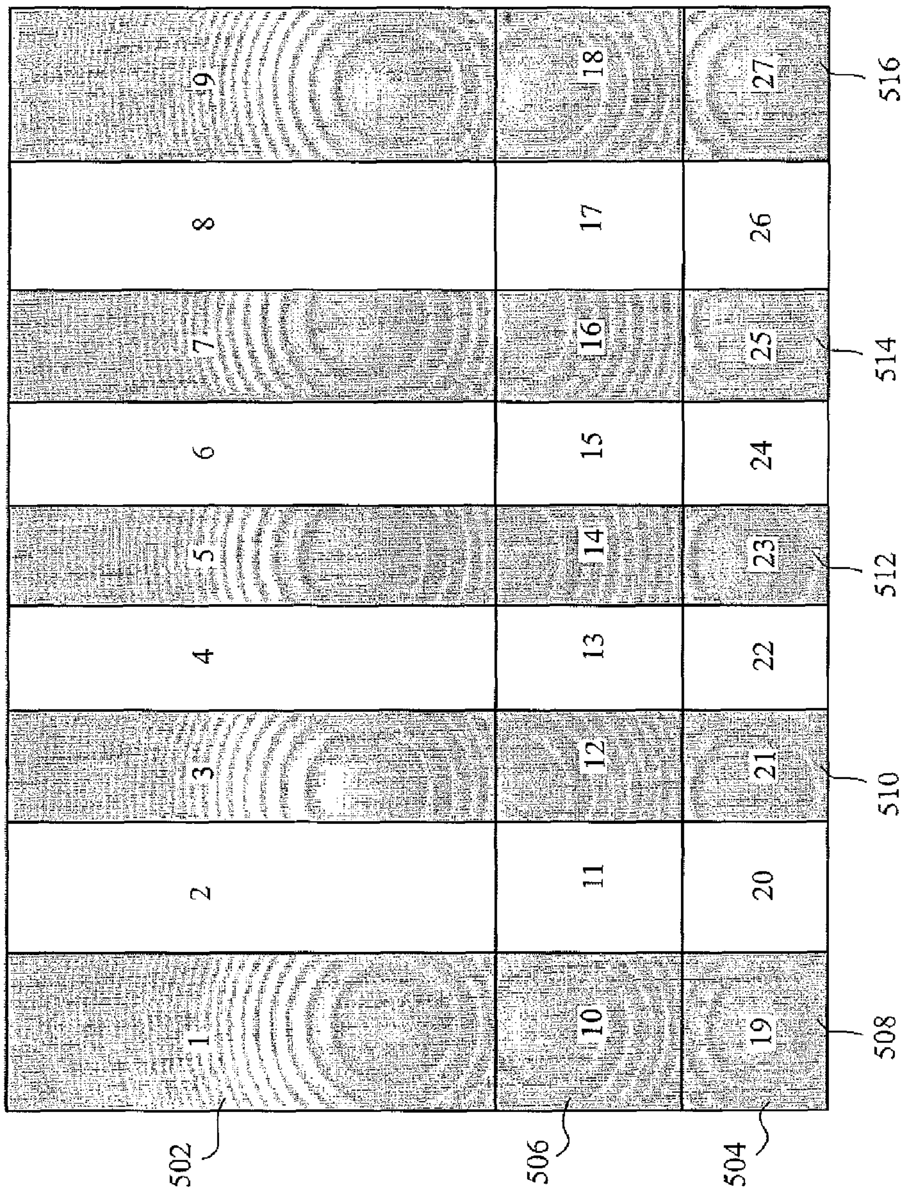
FIG. 5 illustrates a lens according to an embodiment.

FIG. 5 depicts a lens 500 according to an embodiment. The lens 500 is identical to that shown in and described with reference to FIG. 4 but for selected facets or regions having been rendered ineffective or omitted i.e. not formed. In the embodiment shown, it can be seen that the even numbered facets of the top 502 and bottom rows 504 of FIG. 4 have been omitted or rendered ineffective in the lens 500. Similarly, the odd numbered facets of the middle row 506 of the lens shown in FIG. 4 have been omitted or rendered ineffective in the lens 500 according to the embodiment. This arrangement results in five columns 508 to 516 of Fresnel facets with each column comprising three such Fresnel facets.

Figure 6:
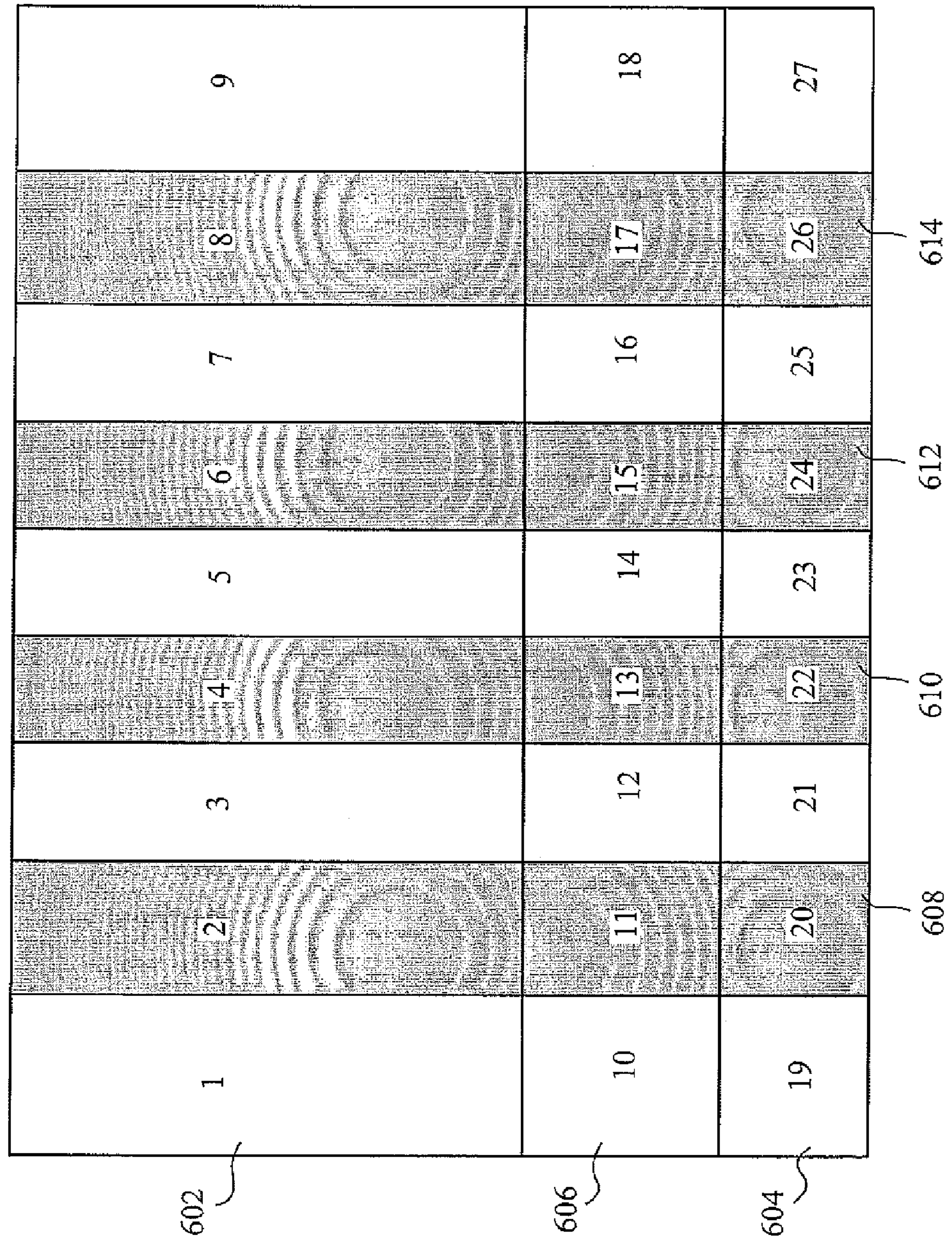
FIG. 6 depicts a lens according to another embodiment.

FIG. 6 depicts a lens 600 according to an embodiment. The lens 600 is identical to that shown in and described with reference to FIG. 4 but for selected facets or regions having been rendered ineffective or omitted i.e. not formed. In the embodiment shown, it can be seen that the odd numbered facets of the top 602 and bottom 604 rows of FIG. 4 have been omitted or rendered ineffective in the lens 600. Similarly, the even numbered facets of the middle row 606 of the lens shown in FIG. 4 have been omitted or rendered ineffective in the lens 600 according to the embodiment. This arrangement results in four columns 608 to 614 of Fresnel facets with each column comprising three such Fresnel facets.

Therefore, it will be appreciated that not all of the facets of the lens 400 are used in forming or using the lenses 116 and 118, that is, some of the facets are masked to prevent transmission, and subsequent focusing, of infrared radiation onto a respective PIR detector or detectors. The masking is achieved by placing an infrared attenuating or absorbing material on the inwardly directed faces of the lenses 116 and 118 in registry with facets that are to be rendered ineffective. Furthermore, the masking of the lenses 116 and 118 is such that the fields of view of one lens do not overlap with the fields of view of the other lens. Alternatively, embodiments can be realised in which the facets or regions of the lenses 116 and 118 that are intended to be masked or rendered ineffective are fabricated from or contain a material that prevents or at least substantially reduces transmission of infrared radiation.

Figure 7:
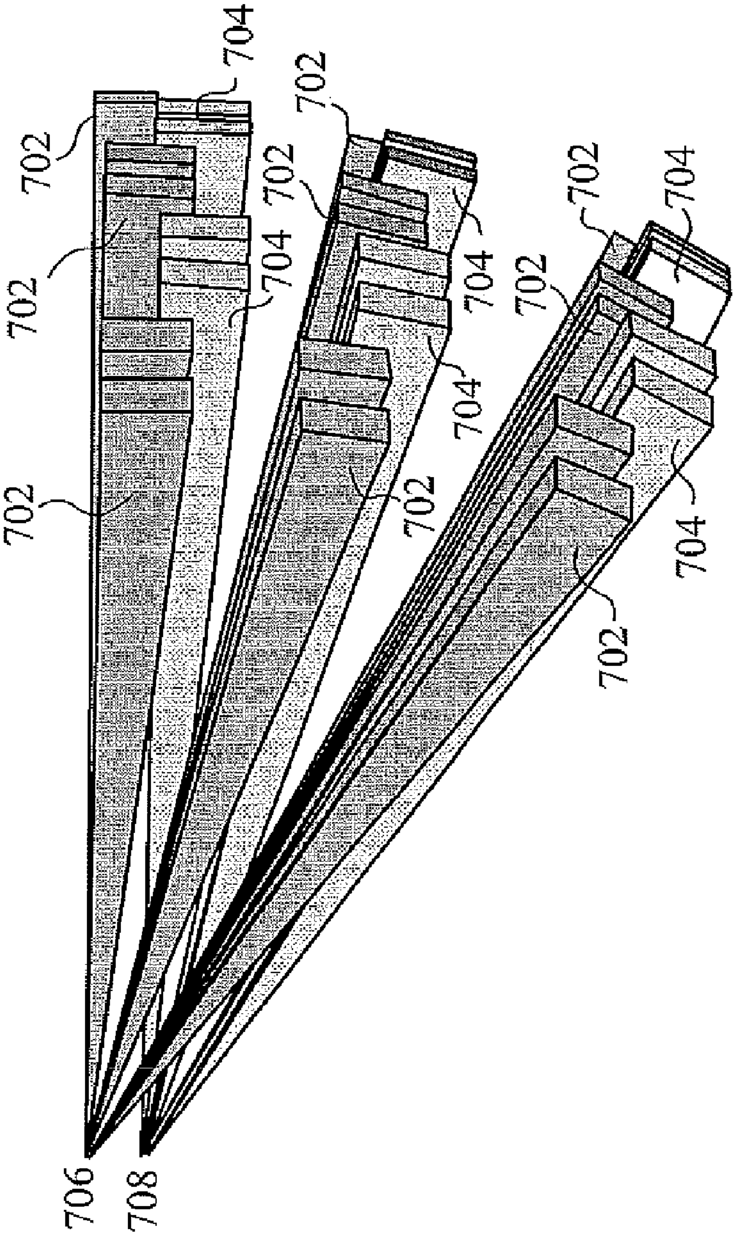
FIG. 7 illustrates schematically the fields of view of the facets of a lens according to an embodiment.

Referring to FIG. 7, there is shown a perspective view 700 of two sets of fields of view derived from two lenses such as lenses 116 and 118 when realised according to FIGS. 5 and 6 respectively. The upper set of fields of view 702 has three rows with three pairs of fields of view or fingers visible of the five columns. It will be appreciated that the fields of view are arranged in pairs due to the construction of PIRs used by those skilled in the art since current PIRs have both positive and negative elements. The lower set of fields of view 704 also comprises three rows but with two pairs of fields of view or fingers of the four columns being visible. The fields of view of the second set 704 are disposed in between the fields of view of the first set, that is, they are interdigitated. However, the fields of view of the first set 702 do not overlap with or intersect the fields of view of the second set 704. It can be appreciated that the focuses 706 and 708 of the first 702 and second 704 sets of fields of view are offset. In preferred embodiments, the first 702 and second 702 fields of view are vertically offset. In preferred embodiments, the foci are offset by between 2 and 10 cm.

Figure 8:
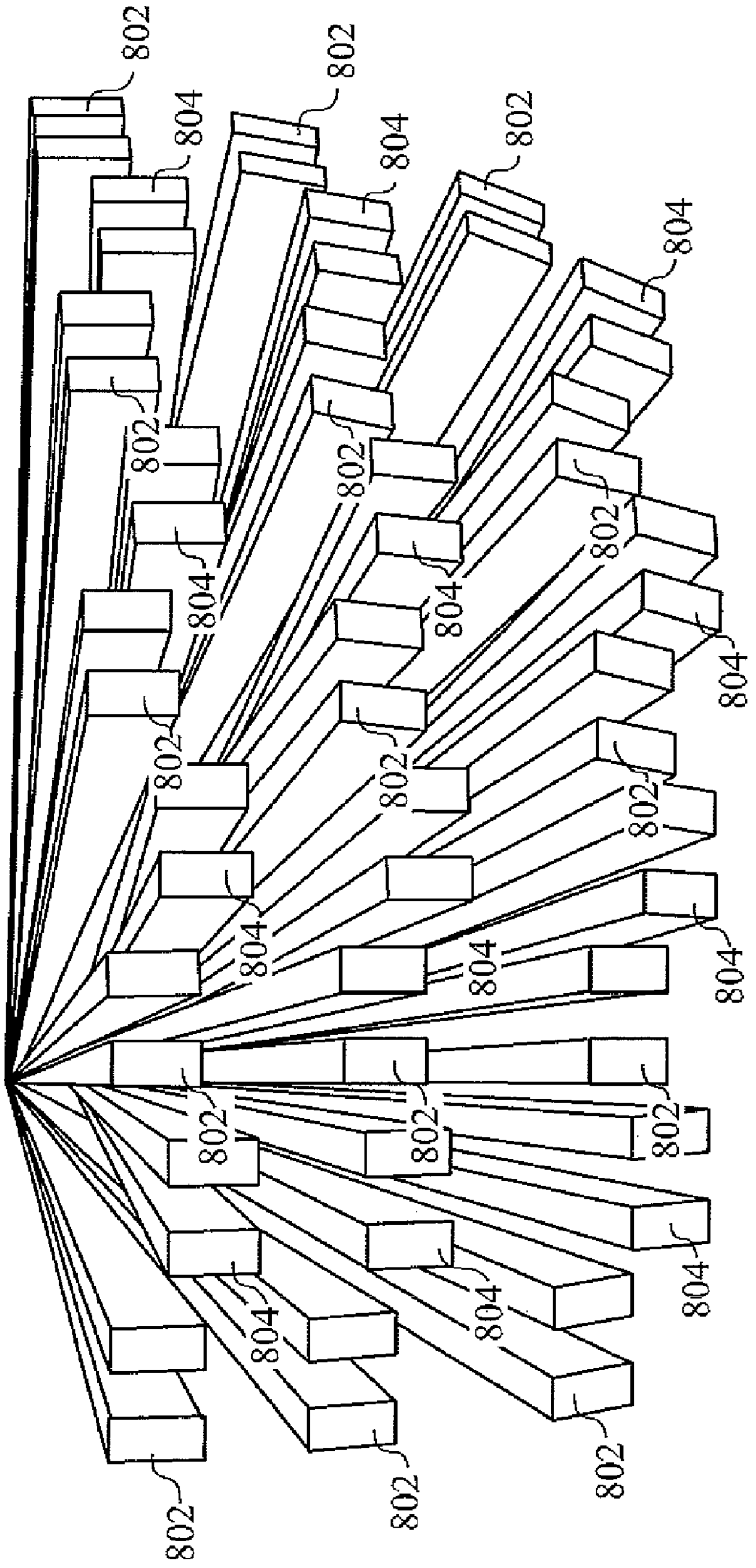
FIG. 8 depicts schematically further fields of views of facets of a lens according to an embodiment.

FIG. 8 illustrates a second perspective 800 of the first 702 and second 704 fields of views shown in FIG. 7. It can be seen that all of the five columns of the fields of view of the lens according to FIG. 5 are visible and that the first set 702 of fields of view comprises three rows of five pairs of fields of view or fingers interposed with three rows of four pairs of fields of view of the second set 704 produced by a lens according to FIG. 6.

It will be appreciated that the fields of view are separate, that is, they do not overlap.

Figure 9:
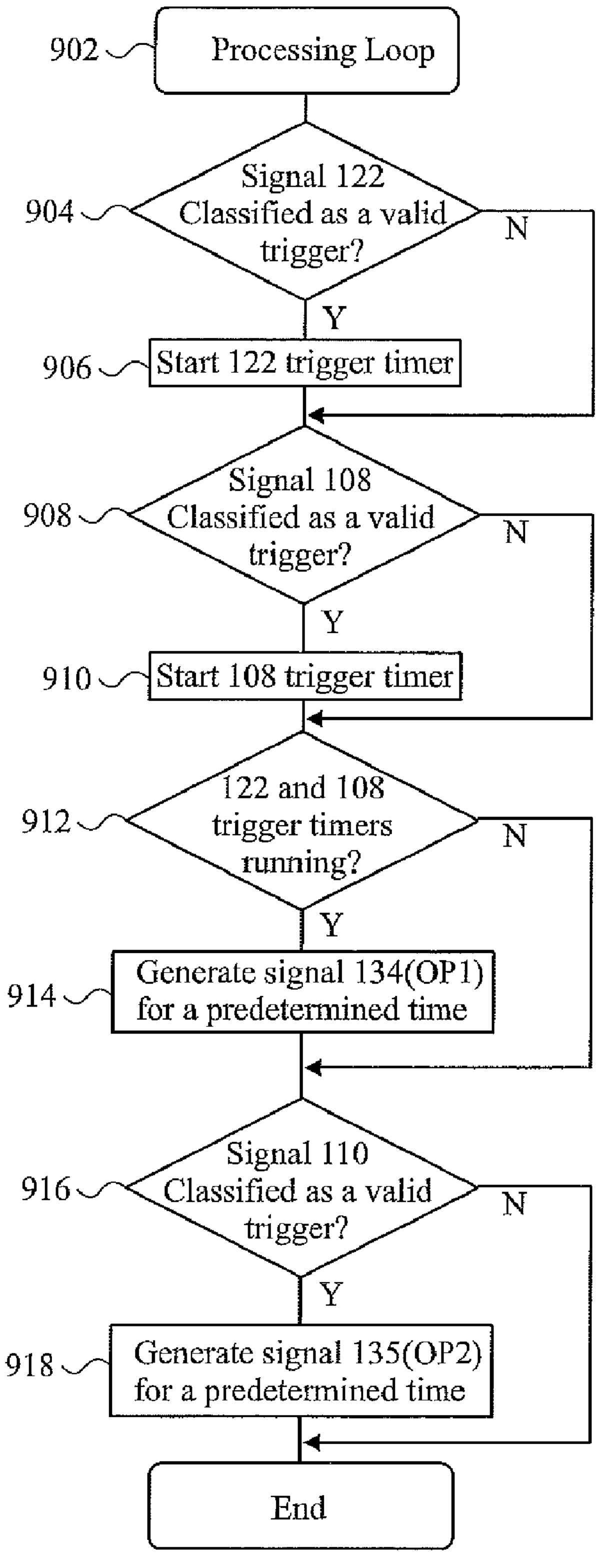
FIG. 9 shows a flow chart of the processing performed according to an embodiment.

Referring to FIG. 9, there is illustrated a flow chart 900 of the processing undertaken by the processor when executing the software in processing the signals received from the microwave and PIR detectors. The processor 128, executing the software 130, is arranged to be "idle" until the detection of the signal or trigger from at least one of the microwave detector 106 and the passive infrared detectors 102 and 104 or from all of the detectors 102 to 106. The idle state of the processor 128 is achieved, for example, using a processing loop such as that shown at step 902 in FIG. 9. Alternatively, the "idle" state of the processor 128 can be left if the signals from at least one of the microwave detector 106 and the passive infrared detectors 102 and 104, or from all of the detectors 102 to 106, is or are used as an interrupt or interrupts that is or are serviced by the processor 128 according to the software 130.

One skilled in the art appreciates that the processing loop or "idle" state are actually used to perform other tasks within the movement detector such as, for example, temperature measurements, self-testing, compensation measurements/actions etc. Therefore, it is not strictly correct to describe the processing loop or processor as idle.

In an embodiment, a determination is made, at step 904, as to whether or not the signal 122 received from the microwave detector 106 is indicative of detection of an event, that is, can be properly classified as a valid trigger signal. If the signal 122 is determined at step 904 to be indicative of detection of an event such as, for example, detection of movement by the microwave detector 106, a timer corresponding to or associated with the microwave detector 106 is started at step 906. If the determination at step 904 is that the signal 122 is not indicative of detection of an event, a determination is made at step 908 as to whether or not the processing loop 902 or "idle" state was interrupted by a signal 108 from the first passive infrared detector 102. If the determination at step 908 is positive, a timer associated with the first passive infrared detector 102 is started at step 910. However, if the determination at step 908 is negative, processing proceeds to step 912. A determination is made at step 912 as to whether or not the timer associated with the microwave detector 106 and the timer associated with the first passive infrared detector 102 are both running. If the determination is positive, an alarm signal 134 is generated for a predetermined period of time at step 914. If the determination at step 912 is negative, a determination is made, at step 916, as to whether not the signal that interrupted the processing at step 902 or the "idle" state was signal 110 from the second passive infrared detector 104. If the determination at step 916 is negative, the processing loop 902 is re-entered or the "idle" state is re-entered. However, if the determination at step 916 is positive, an output signal or alarm signal 135 is output, at step 918, via the second output terminal OP2 for a predetermined period of time. Thereafter, processing returns to step 902 or the "idle" state is re-entered.

Figure 10:
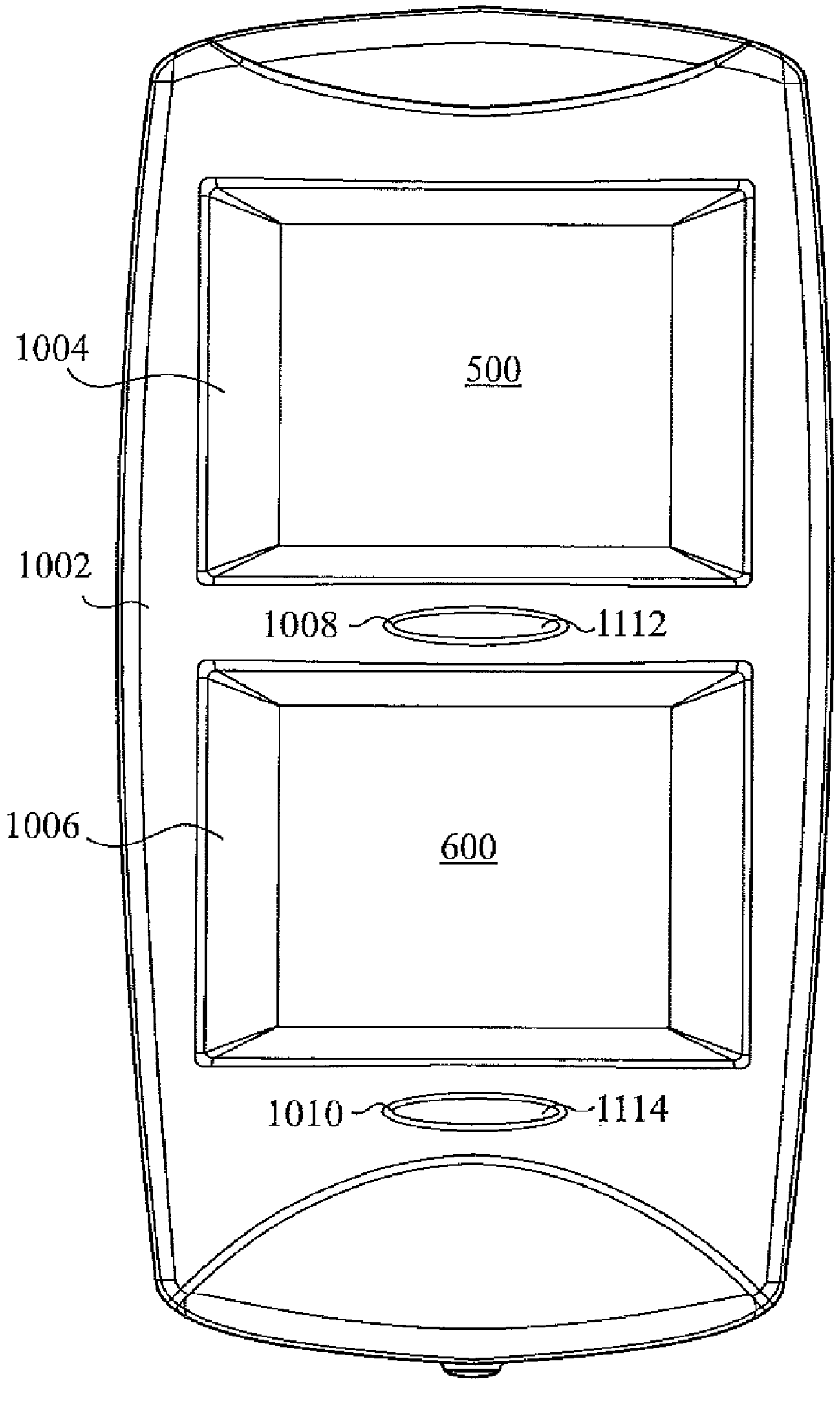
FIGS. 10 and 11 illustrate a detector according to an embodiment.

Referring to FIG. 10, there is shown a front view 1000 of a combined detector according to an embodiment. It can be appreciated that the combined detector comprises a front cover 1002 having to apertures or windows 1004 and 1006 and bearing lenses such as those shown in FIGS. 5 and 6. The front cover 102 optionally comprises a further pair of apertures 1008 and 1010 bearing optical guides 1012 and 1014 for outputting light from LEDs to provide an indication that the combined detector is operating correctly.

Figure 11:
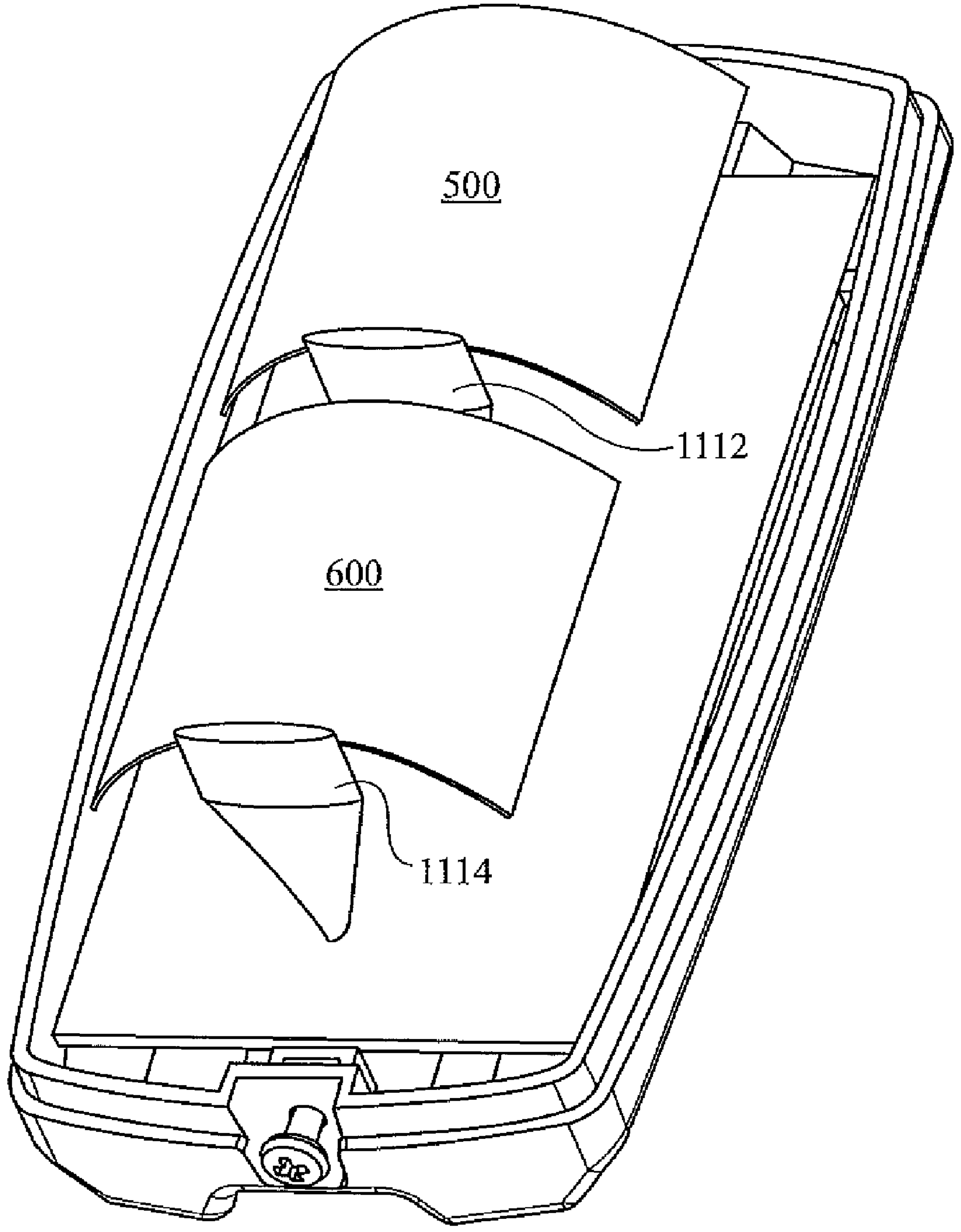

FIG. 11 shows a further view 1100 of the combined detector illustrated in FIG. 10 with the front cover 1002 removed. It can be appreciated that the pair of lenses 500 and 600 are curved. Also more clearly illustrated are the optical guides 1012 and 1014. The curved nature of the lenses may contribute, at least in part, to maintaining the separation of the fields of view.

It will be appreciated that the processing undertaken in FIG. 9, insofar as concerns the processing of the output signals from the PIR detectors, is arranged to realise a detector providing a sequentially confirmed alarm.

In the above described embodiment, it can be appreciated that the fields of view 702, 704, 802 and 804 are arranged such that in a single direction, i.e. horizontally, the fields of view of individual facets of the lenses 116, 118 are alternately arranged such that, for example, the field of view due to one facet of one of the lenses 116 is adjacent only to fields of view of the other lens 118 in the single direction. In the embodiment described above this direction is horizontal. It can also be appreciated that, in alternative embodiments, the direction is a direction other than horizontal and can be, for example, vertical or 45° from the horizontal.

Figure 12:
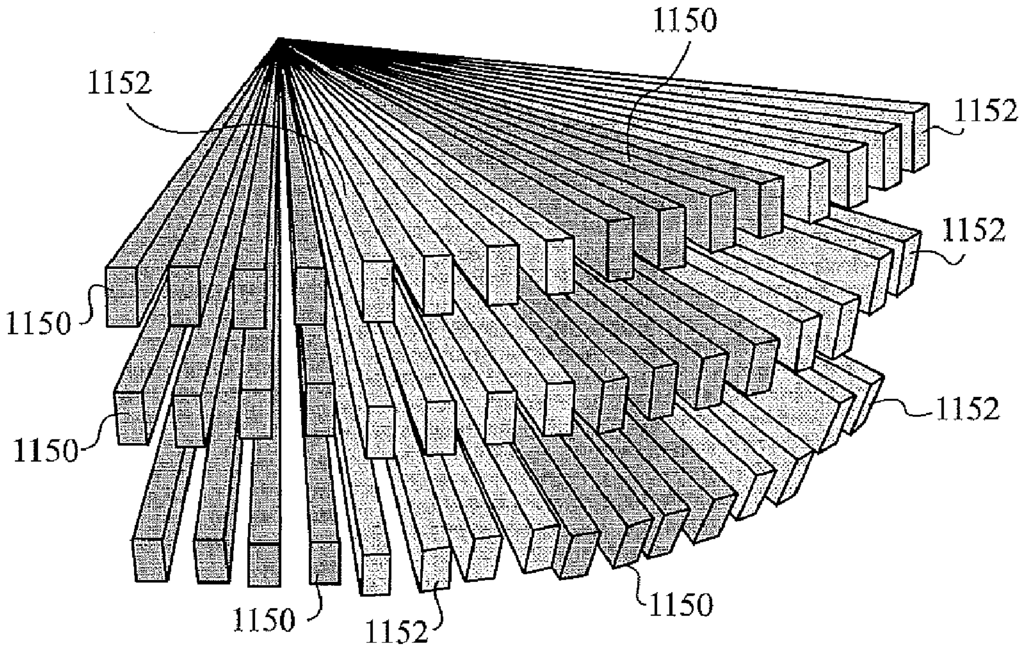
FIGS. 12, 13 and 14 illustrate the fields of view of the facets of a lens according to further embodiments.
Figure 13:
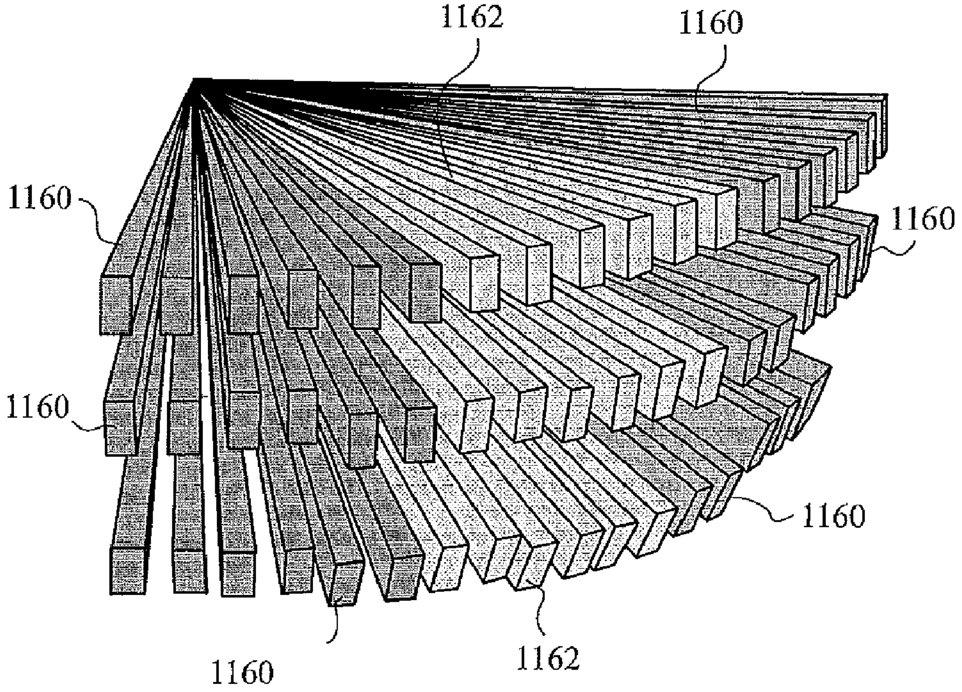

In certain embodiments, the fields of view of one lens can be arranged in groups of adjacent fields of view of Fresnel facets. For example, FIG. 12 shows the fields of view of the lenses in a further embodiment. The fields of view are arranged in three rows such that in each row, from left to right, are two pairs (positive and negative) fields of view 1150 of a first lens, followed by two pairs of fields of view 1152 of a second lens, followed by two pairs of fields of view 1150 of the first lens, followed by two pairs of fields of view 1152 of the second lens. This is a 2-2-2-2 arrangement. FIG. 13 shows another embodiment, where the fields of view are arranged in three rows. Each row comprises, from left to right, three pairs of fields of view 1160 of a first lens, followed by three pairs of fields of view 1162 of a second lens, followed by three pairs of fields of view 1160 of the first lens. This is a 3-3-3 arrangement.

It can be appreciated that the fields of view can be configured in many other arrangements. Examples of arrangements include, among others, 1-3-1, 2-3-2, 1-1-1, 1-2-1, 1-3-1, 2-3-2, 3-2-3, 2-1-2, 2-2-2, 2-3-2, 3-1-3, 2-2-2-2, 2-1-2-1, 1-2-2-1 and 1-3-3-1. Furthermore, in certain embodiments different rows may contain different arrangements. The rows of the embodiment shown in FIGS. 7 and 8 are a 1-1-1-1-1-1-1-1 arrangement.

Figure 14:
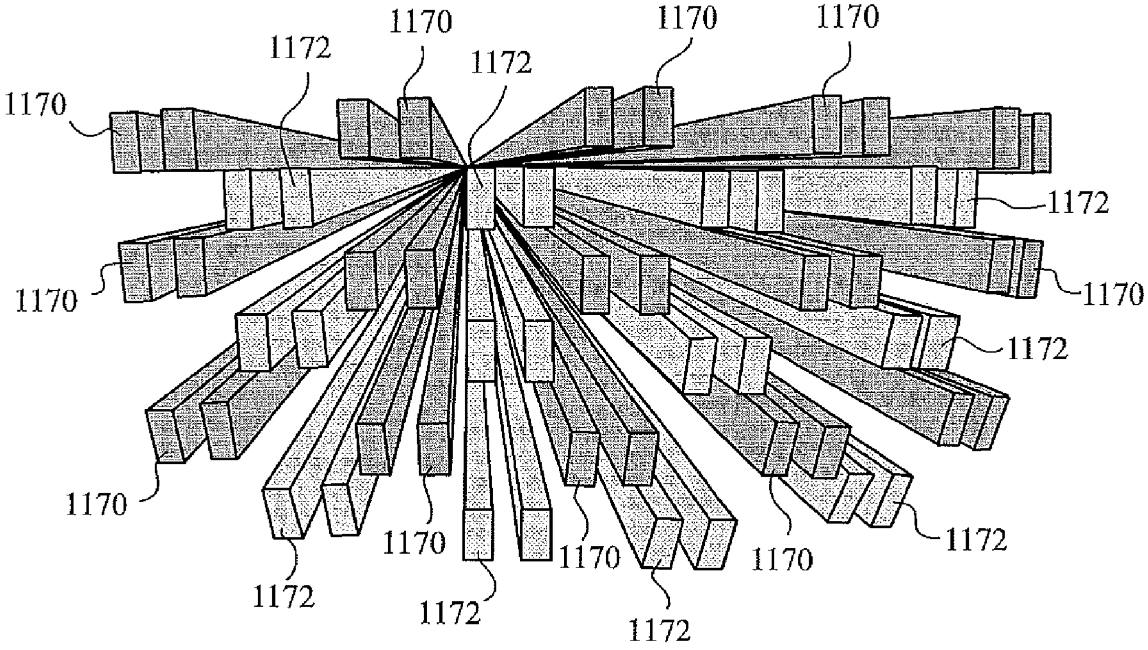

In certain embodiments, the fields of view of the first and second lenses need not be aligned in rows. For example, as shown in FIG. 14, fields of view 1170 of one lens may be vertically displaced relative to fields of view 1172 of the other lens, as well as being horizontally displaced. Fields of view of one lens are also arranged in columns. Of course, horizontal and vertical as referred to herein, as well as rows and columns, are only exemplary directions and the orientation of the fields of view 1170 and 1172 (and for other embodiments) may change as appropriate.

In other embodiments, the fields of view need not be linearly arranged. For example, the fields of view in other embodiments may be arranged in a checkerboard pattern or any other arrangement.

A single field of view referred to herein may in fact comprise a plurality of fields of view. For example where one field of view or pair (positive and negative) are described, it can be appreciated that there are embodiments where the one field of view or pair are in fact made up of a plurality of fields of view due to a plurality of facets.

Although the embodiments have been described with reference to the combined detector generating an intrusion signal in response to detecting an intruder, embodiments can be realised in which an intrusion message is generated as well as, or as an alternative to, such an intrusion signal.

Furthermore, embodiments have been described with reference to combined detectors. However, embodiments can be realised in which single technology sensors or detectors are used.

The embodiments described above have been realised using a common master for all facets. However, embodiments are not limited thereto. Embodiments can be realised in which a number of Fresnel masters can be used to form the facets.

Although the above embodiments have been described with reference to a combined detector comprising dual technology sensors or detectors, embodiments are not limited thereto. Embodiments can be realised in which the detector merely comprises, for example, a pair or multiple PIR detectors. Such embodiments will still have the capability of providing a sequentially confirmed alarm. It will be appreciated that the use of a second technology such as, for example, microwave or ultrasound technology, assists in providing greater immunity to false alarms.

Anti-masking

Figure 15:
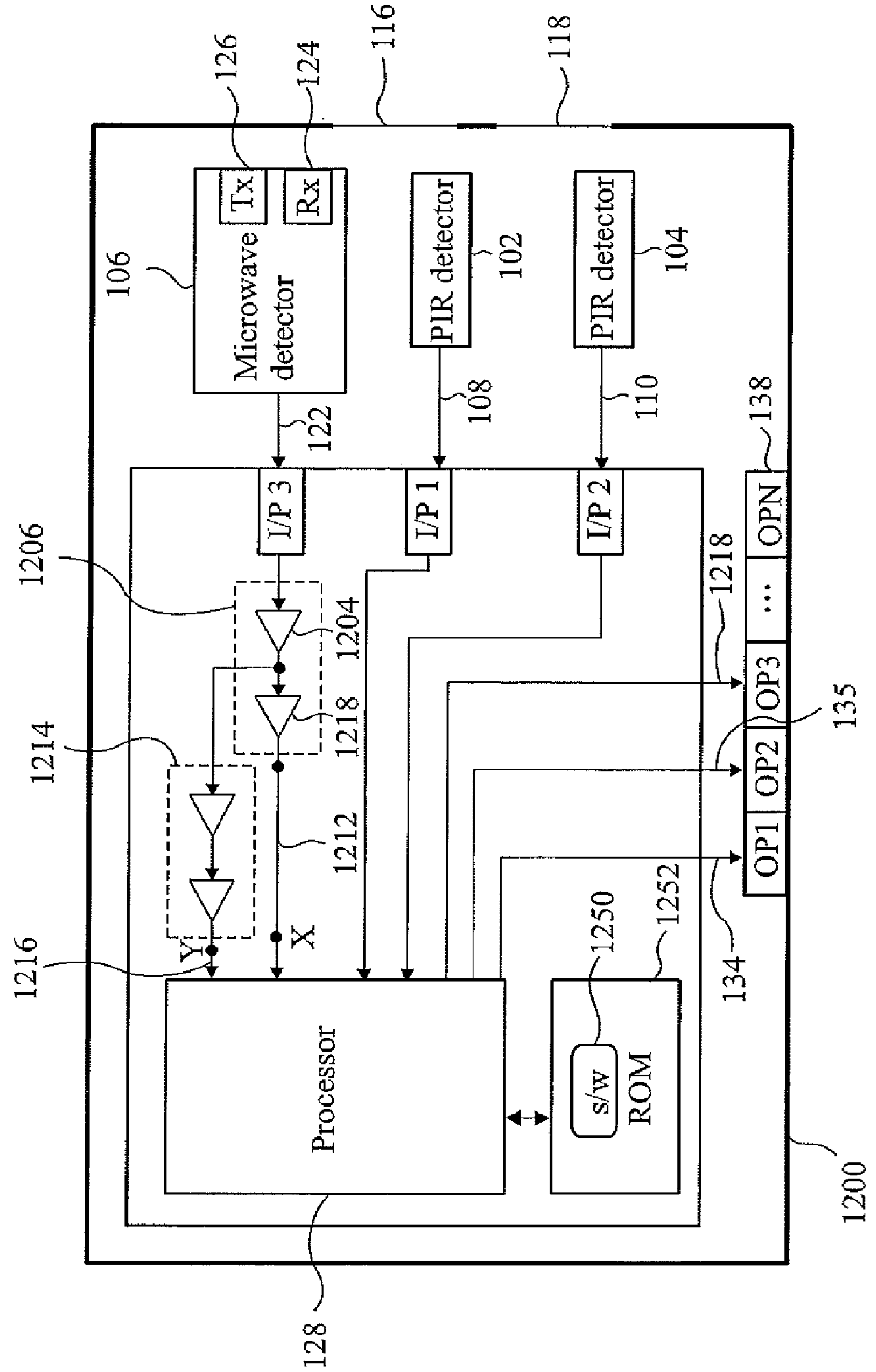
FIG. 15 shows a combined detector according to a further embodiment.
Figure 16A:
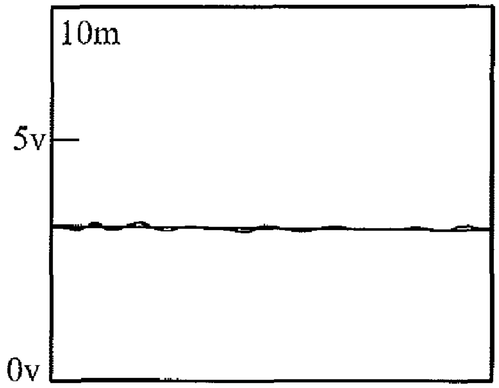
FIGS. 16(*a*), (*b*), (*c*) and (*d*) show the signals at points X and Y in FIG. 12 when an event is detected at 10 meters and at 50 cm.
Figure 16B:
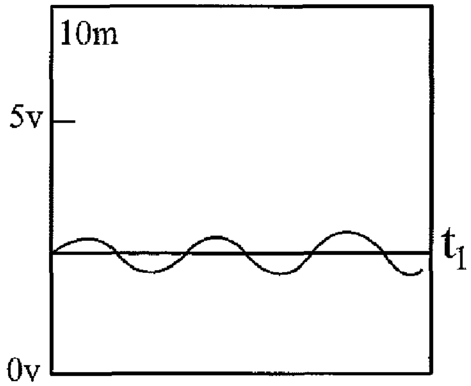
Figure 16C:
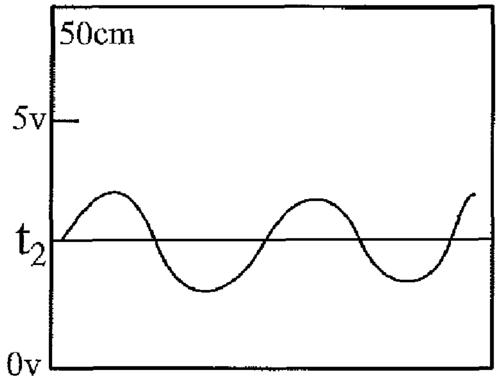
Figure 16D:
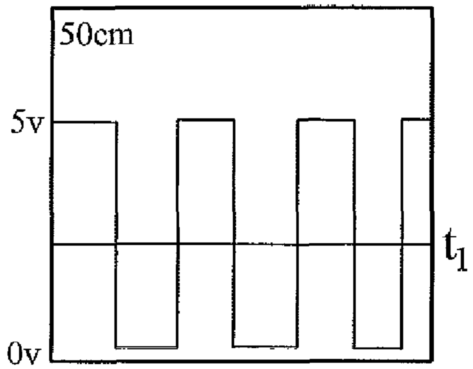

Referring to FIG. 15, there is shown a second embodiment of the invention which comprises a detector 1200 with anti-masking capability. Where components in the detector are the same as those in the detector shown in FIG. 1, the components are given like reference numerals.

The detector 1200 comprises a pair of PIR detectors 102 and 104 and a microwave detector 106. The PIR detectors 102 and 104 generate outputs 108 and 110 respectively in response to receiving infrared radiation emitted by an intruder entering the fields of view of respective lenses 116 and 118. The output 108 of PIR detector 102 is provided to input I/P 1 of a processor or circuit board 1202 for further processing. The output 110 of the PIR sensor 104 is connected to the input I/P 2 of the processor board 1202. In preferred embodiments, the outputs 108 and 110 are amplified.

The output 122 of the microwave detector 106 is provided to input I/P3 of the processor board 1202.

The processor board 1202 comprises a processor 128 that is arranged to execute software 1250 stored in a memory 1252. The memory 1252 comprises a ROM.

The input I/P 3 is connected to the input of a first stage 1204 of a first two-stage amplifier 1206 on the processor board 1202. The output of the first stage 1204 of the first two-stage amplifier 1206 is connected to the input of a second two-stage amplifier 1214. The output 1216 of the second two-stage amplifier 1214 is connected at point Y to the processor 128. However, other methods of getting a signal from I/P3 to point Y are possible.

The output 1212 of the second stage 1218 of the first two-stage amplifier 1206 is connected at point X to the processor 128.

The signals at points X and Y in FIG. 1214 corresponding to the detection of an event, are illustrated in FIG. 16. FIG. 16(*a*) shows the signal at point X when an event is detected by the microwave detector 106 at a distance of more than 50 cm (a distant event). The signal, though amplified by the first two-stage amplifier 1206, is still extremely small. The output 1216 of the second two-stage amplifier 1214 at point Y is shown in FIG. 16(*b*). It can be seen that the signal exceeds the threshold $t_1$. The processor 128 monitors the amplitudes of the signals 1212 and 1216 which are provided to ADC (analogue to digital converter) inputs of the processor 128. The processor 128 can therefore detect when the signal 1216 exceeds the threshold $t_1$.

The effect of an event being detected at 50 cm distance or less (a proximate event) is shown in FIGS. 16(*c*) and 16(*d*). From FIG. 16(*c*) it can be seen that the signal at point Y, the output of the second two-stage amplifier 1214, has overloaded the system. This larger signal will, of course, also exceed the threshold $t_1$. However the signal 1216 at point X, shown in FIG. 16(*d*), is also greater than the threshold $t_2$, as detected by the processor 128. In this event, which triggers the start of a masking detection sequence, a timer corresponding to or associated with the signal 1212 is started.

The detector 1200 includes potentiometers (not shown) which can be adjusted in order to set the levels of the thresholds $t_1$ and $t_2$. However it can be appreciated that the level of the thresholds can be set in other ways. Adjusting the thresholds can adjust the distance at which events could be classed as proximate events. For example, the distance could be increased such that proximate events are events detected at a distance of 1 meter or less, and distant events are events detected at a distance of over 1 meter. Alternatively, for example, events detected at a distance of 2 meters or less can be classed as proximate events, and events detected at a distance of over 2 meters are proximate events. The distance could also be decreased so, for example, events detected at a distance of 40 cm or less can be classed as proximate events, and events detected at a distance greater than 40 cm can be classed as distant events.

The processor 128 then waits for about a predetermined period for time, such as, for example 15, seconds (as indicated by the timer) to allow the microwave detector 106 to return to its inactive condition. It will be appreciated that other time periods could equally well be used. There follows a further 15 seconds when the processor 128 waits for a signal 1212 or 1216 to confirm that the timer can be reset (set to zero and stopped) or restarted (set to zero but not stopped). If a signal 1216 indicating a distant event is received from the second two-stage amplifier 1214, the timer is reset and the sequence terminated. If a signal 1212 indicating a proximate event is received from the first two-stage amplifier 1206, the timer is restarted, so it starts counting from zero, and the sequence restarted. If no such signal is received, either because there is a fault in the system, or because the microwave detector 106 has been masked, the processor 128 sends an output signal 1218 indicating a fault condition (also referred to as a masking indicating output) to an output OP 3 from the detector 1200.

The output OP 3 indicating the fault remains active, such that when the alarm system to which the detector 1200 is connected is armed, the fault condition continues to be indicated, and will inform the alarm system until the fault is corrected.

It can be seen that, in this way, the microwave detector 106 cannot be disabled by masking whilst the alarm system is un-armed, without this fact becoming apparent to an operator seeking to arm the system.

It should be noted that where the processor is waiting, for example waiting for the end of the first 15 second period, the processor is not necessarily idle, and may be performing other tasks, such as, for example, carrying out the process shown in FIG. 9.

It should be stressed that the masking detection sequence is triggered only when a signal 1212 is received indicating that an event has been detected within a short distance from the sensor, and the timer corresponding to or associated with the signal 1212 would normally be re-set (and the masking detection sequence ended) by the detection of a further distant event within its second 15 sec period of operation. Only if the processor 128 does not receive confirmation of an event within its second 15 second period will the fault output OP 3 be activated.

Whilst the anti-masking capability of the detector 1200 may also or alternatively be useful in detecting electrical faults in, or tampering with, the detector 1200, its most important application is as an anti-masking system in the prevention of accidental or deliberate masking of the event detection device, which, for the purposes of this specification, is also described herein as a fault condition.

The processor 128 in the detector 1200 carries out the process shown in the flow chart of FIG. 9, except that signal 1216 from the second two-stage amplifier 1214 is used in place of the signal 108 to start the 108 trigger timer. In addition, the processor 128 carries out the process (masking detection sequence) described above to implement the anti-masking capability. This process can be implemented as a separate process to that shown in FIG. 9, or the processes can be combined into a single process. In certain embodiments, the anti-masking process can be activated using the signal 1212 as an interrupt indicating that a proximate event has occurred and the masking detection sequence should be started.

It is appreciated that the anti-masking capability can be implemented for any one or more of the detectors 102, 104 and 106 in the detector 1200. In alternative embodiments containing more or fewer PIR, microwave or other detectors, the anti-masking capability can be implemented for any one or more of the detectors.

In certain embodiments containing a microwave detector and at least one PIR detector, the processor 128 may in the second 15 second period wait for confirmation of the detected event by a logic "AND" of the signals from the microwave detector and the PIR sensor. If, in the second 15 second period, only one of the detectors indicates that an event has occurred, or neither detector indicates that an event has occurred, at the end of the period the processor 128 will send an output signal 1218 indicating a fault condition to an output OP 3. The output OP 3 indicating the fault condition will remain active until the fault has been corrected. If instead both detectors indicate that a distant event has occurred, the timer is re-set and the sequence terminated.

Anti-Blocking

In a further embodiment of the invention, the detector 100 of FIG. 1 includes anti-blocking capability.

Figure 17:
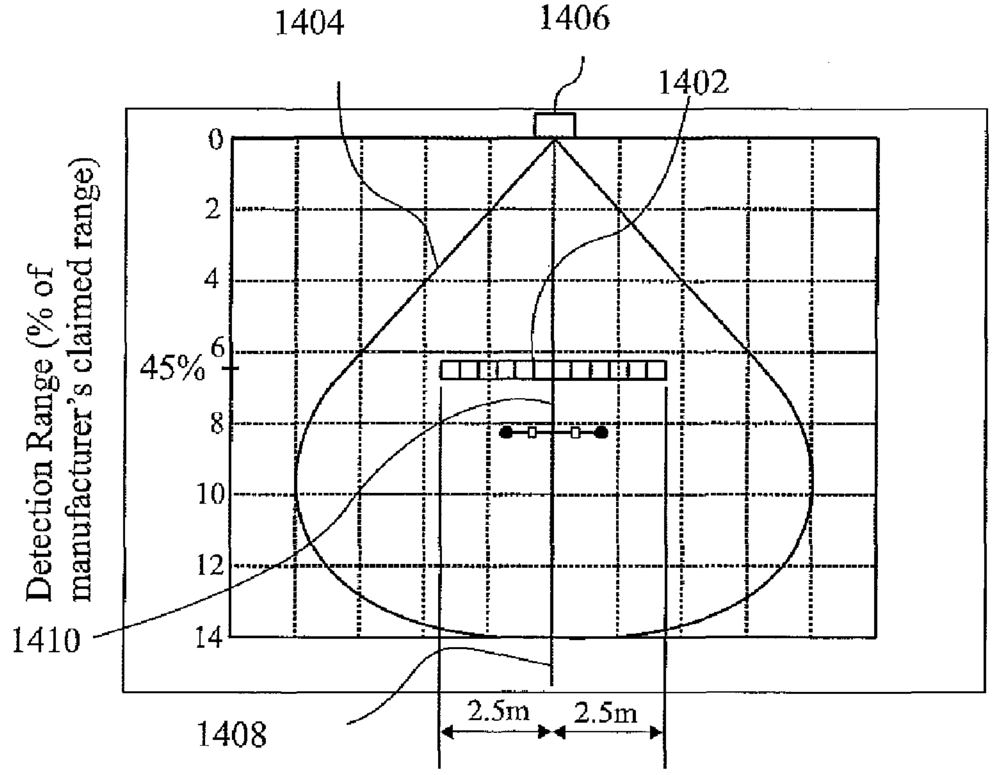
FIG. 17 shows the arrangement for satisfying the significant range reduction test described above.

FIG. 17 illustrates a test arrangement 1400 for verifying a significant reduction of a specified range (or blocking of the detector) as prescribed by 6.4.5 of CLC/TS 50131-2-4 or 2:2004. It can be appreciated that a barrier of cardboard boxes 1402 is erected within the field of view 1404 of the detector 1406. It can be appreciated that the cardboard boxes 1402 a form a barrier across the detector axis 1408 at a distance of 45% of the manufacturer's claimed detection range. The barrier of cardboard boxes 1402 covers a horizontal distance of 2.5 meters either side of the detector axis 1408 and has a vertical height of 3 meters. It can be appreciated that a test point 1410 is positioned at a distance of 55% of the manufacturer's claimed detection range. Two test directions are used, which begin at a distance of 1.5 meters before the test point and finishing 1.5 meters after it and are perpendicular to the detector axis 1408.

Figure 18:
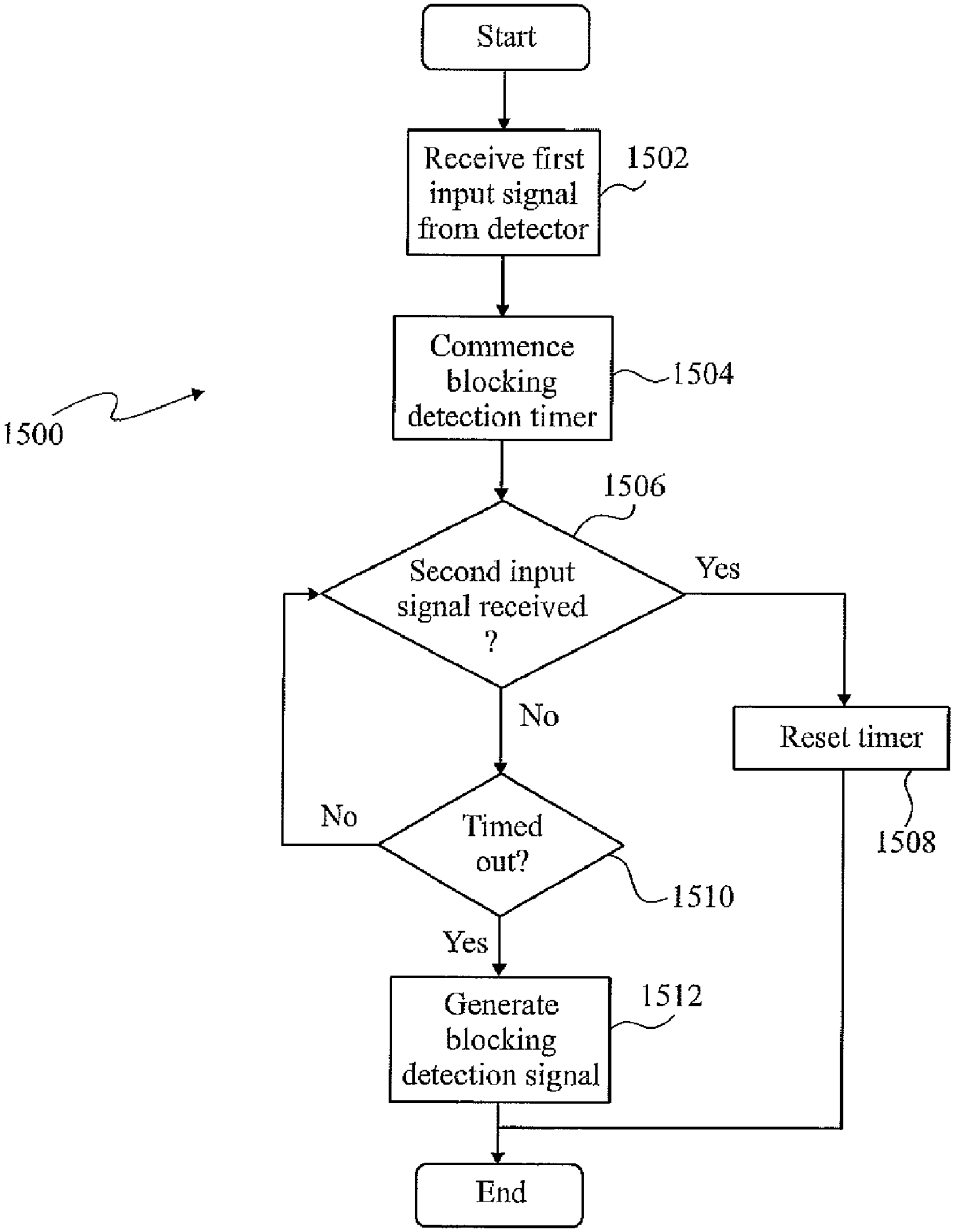
FIG. 18 illustrates a flow chart for at least part of software according to an embodiment.

The software 130 in this embodiment includes software to implement the anti-blocking capability. FIG. 18 shows a flowchart 1500 implemented by the above-mentioned software that is executed by the processor 128. The flowchart shows an embodiment of a blocking detection sequence. A first input signal is received by the processor 128 from a corresponding detector 102, 104 or 106 at step 1502. Receipt of the first input signal starts a blocking detection timer (not shown) at step 1504. Embodiments can be realised such that either (a) the timer is commenced in response to the first input signal exceeding a threshold a predetermined number of times within the first time period or (b) the first signal breaches the threshold for a cumulative percentage of time during the first time period, which may a single threshold crossing or multiple threshold crossings. The timer is used to establish a period of time during which the software is arranged to detect or process the second input signal from the, or a, detector. Therefore, a determination is made, at step 1506, as to whether or not such a second input signal has been received. If it is determined that such a second input signal has been received, the timer is reset at step 1508, and the blocking detection sequence ends. However, if it is determined at step 1506 that a second input signal has not been received, a determination is made at step 1510 as to whether or not the timer commenced at step 1504 has timed out. If the determination at step 1510 is that the timer has not timed out, processing returns to step 1506. However, if the determination at step 1510 is that the timer has timed out, the processor at step 1512 provides an indication of range reduction detection via one of the output ports of the detector, for example via output OP 4 (not shown), as a blocking detection signal. The process (and the blocking detection sequence) then ends. The software 130 can implement the process shown in FIG. 16 as a process separate from that shown in FIG. 9 or the processes can be combined into a single process.

In certain embodiments, the first and second input signals are derived from the same sensor. If the sensor providing the first and second input signals is the microwave sensor 106, then the first and second input signals will relate to detection of movement within a respective protected volume 1404 by the microwave sensor 106, that is, both the first and second input signals will be of a first type. However, if the sensor providing the first and second input signals is a PIR sensor 102 or 104, the first and second input signals will relate to detection of movement within the field of view of the PIR sensor, that is, both the first and second input signals will be of a second type.

In alternative embodiments, it will be appreciated that the first and second input signals could be derived from different detectors. However, one skilled in the art will also appreciate that the first and second input signals could both be derived from a single detector.

It will be appreciated that embodiments of the detector which implement the anti-blocking capability are able to meet the test set out in 6.4.5 of CLC/TS 50131-2-4:2004 since, for example, a person performing the SWT at the test point will be detected by the microwave sensor 106, which will start the timer, but will not be detected by the PIR sensor 102. Therefore, the PIR signal 108, that is, the second input signal, will not be received and will not reset or stop the timer. Hence, the timer will time out, that is, a preset period of time, measured from receipt of the first input signal, will elapse, which will, in turn, generate, or cause to be generated, the blocking detection signal.

Figure 19:
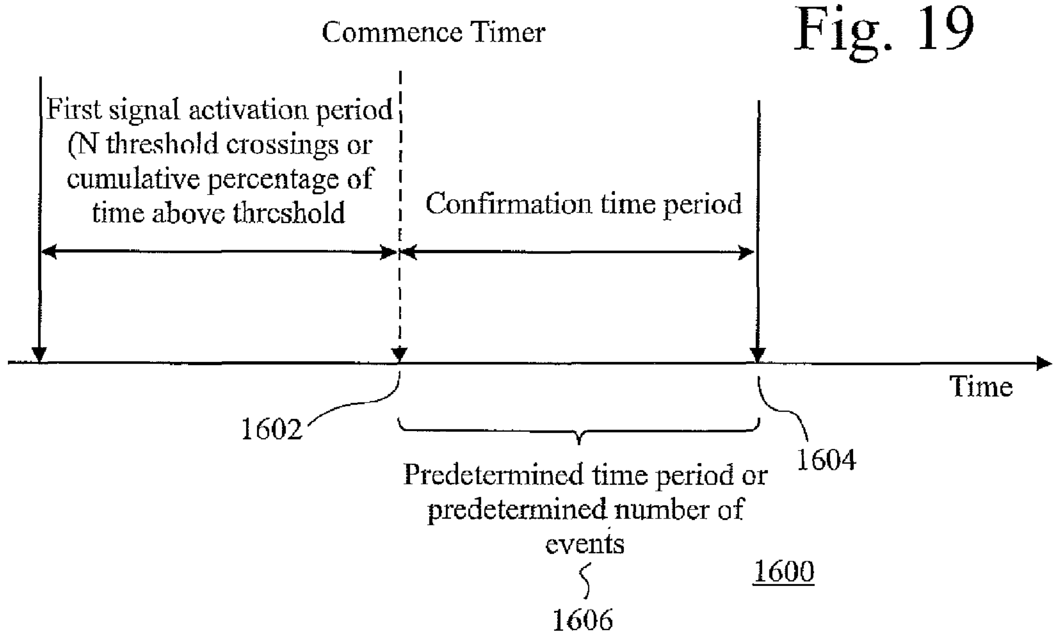
FIG. 19 depicts a timing diagram according to an embodiment.

FIG. 19 shows a timing diagram 1600 comprising a first point in time 1602 at which the blocking detection timer is commenced in response to receipt of the first input signal and a second point in time 1604, which marks the end of the above described preset period of time 1606. As indicated above, embodiments can be realised such that either (a) the timer is commenced in response to the first input signal exceeding a threshold a predetermined number of times within the first time period or (b) the first signal breaches the threshold for a cumulative percentage of time during the first time period, which may be a single threshold crossing or multiple threshold crossings. If the first and second input signals are received during the preset period of time, the timer is reset. If the first and second input signals are not received during the preset period of time, the blocking detection signal is generated at or after the second point in time 1604. Although this embodiment has been described with reference to the blocking detection timer being reset only by the subsequent detection of both the first signal and the second signal, embodiments can be realised in which the timer is reset by receiving only the second signal during the time period.

Figure 20:
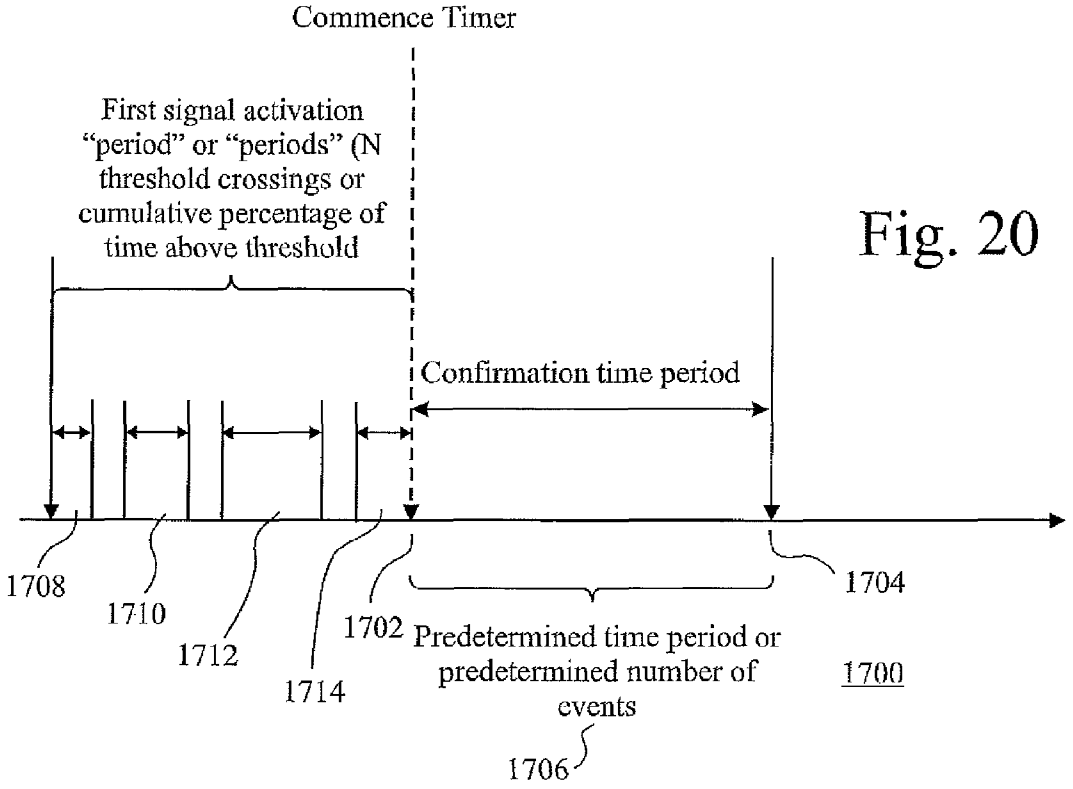
FIG. 20 shows a further timing diagram according to an embodiment.

Embodiments can be realised in which the preset period of time is, for example, a maximum of 180 seconds. Alternative embodiments can be realised in which the preset period of time is 15 seconds. Also, the first and second periods of time might be unequal rather than being substantially equal as depicted in FIG. 19. Still further, the time period can be programmable or different such that different detectors have respective periods of time, that is, different values for the number of threshold crossing to start the timer or different percentage cumulative time above a threshold according to the needs of an installer or user. Preferably, any such programmability would be achieved using switch settings within the detector. Also, although the above embodiments have been described with reference to a single time period during which timer activation are noted, embodiments are not limited to such an arrangement. Embodiments can be realised in which the determination as to whether or not to commence the blocking detection timer is based on first signal activity over a number of time periods, which might be contiguous or non-contiguous, or have the same or different, fixed or varying, durations, with the number of threshold crossing or the percentage of time that the threshold has been exceeded being derived from the, or selected ones of the, number of time periods. Referring to FIG. 20, there is shown a timing diagram 1700 for such an embodiment. In addition to a confirmation time period between the point in time 1702 at which the blocking detection timer is commenced and the time out period 1704, which represents an embodiment of a predetermined time period 1706, it can be appreciated that the "time period" over which activity relating the microwave detector must be detected to start the timer comprises a number of time periods 1708 to 1714. It can be appreciated that the time periods 1708 to 1714 have different durations. They might also be variable. The time period 1708 to 1714 might also be separated by different and/or varying time periods, even though the illustrated embodiment shows equal separation time periods.

It can be appreciated that further embodiments of the present invention contain both anti-masking and anti-blocking capabilities. For example, the software 1250 of the detector 1200 shown in FIG. 15 may implement the process shown in the flow chart shown in FIG. 18 such that the detector 1200 includes blocking detection capability. The process shown in the flow chart of FIG. 18 may be implemented as a separate process or combined with one or more other processes of the software 1250.

In the above described embodiments, timers are implemented by the software provided in the detector. One skilled in the art appreciates that any of the timers can be implemented in a number of ways. For example, a timer can be implemented using a counter that is fed by, or is arranged account pulses of, an oscillator. The counter can be an up or down counter that, upon reaching a preset value, generates the signal marking the end of a preset period of time. If the counter is a counter down counter, it will be initialised with an appropriate value corresponding to a preset period of time when driven by an oscillator having a known time. Alternatively, the value of a clock, which may form part of the processor which may, itself, be implemented in the form of a timer, can be recorded in response to receipt of the first input signal. The clock can be repeatedly interrogated to note the current time or, more accurately, the current account, which can then be used to determine the time since the clock was first interrogated or started. Still further, the starting and stopping or resetting of a timer or recording points in time can be interrupt driven.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

We claim:

1. A detector comprising first and second lenses and respective first and second sensing means; each lens comprising a plurality of Fresnel facets having respective fields of view, the facets of the first and second lenses having complementary masking such that the fields of view of the first lens are adjacent to, but do not overlap with, the fields of view of the second lens in a single direction, the detector further comprising a reduction range or blocking detection apparatus comprising means, responsive to at least a first input signal from at least one of the sensing means, to generate a blocking detection signal after a first period of time unless a second input signal is received within the first period of time from at least one of the sensing means.

2. A detector as claimed in claim 1, wherein the fields of view of the first lens and the fields of view of the second lens have an arrangement selected from: 1-1-1, 1-2-1, 1-3-1, 2-1-2, 2-2-2, 2-3-2, 3-1-3, 3-2-3.

3. A detector as claimed in claim 1, wherein the first and second lenses are identical and facets of the first and second lenses have complementary masking.

4. A detector as claimed in claim 1, further comprising a monitoring system responsive to an output signal of at least one of the sensing means for providing an indication of tampering with the detector, or masking at least one of the sensing means, wherein the monitoring system is responsive to an output signal from at least one of the first and second sensing means indicating the detection of an event proximate to the detector.

5. A detector as claimed in claim 1, further comprising a monitoring system which comprises:

comparator means for comparing a first output signal of one of the first and second sensing means with a threshold signal and for activating a timer when the first output signal exceeds a threshold on a first occasion, masking indicating means adapted to provide a masking indicating output after a predetermined time interval unless at least one of the first and second sensing means generates an output signal in response to the detection of an event on a second occasion within the predetermined time interval.

6. A detector as claimed in claim 5, wherein when the timer is activated, if an output signal indicating a distant event is received from at least one of the sensing means the timer is re-set, and if an output signal indicating a proximate event is received from at least one of the sensing means the timer is re-set and re-started, and if no output signal is received the masking indicating output is activated.

7. A detector as claimed claim 1, further comprising third sensing means and a monitoring system which comprises:

comparator means for comparing a first output signal of one of the first and second sensing means with a threshold signal and for activating a timer when the first output signal exceeds the threshold signal on a first occasion; and masking indicating means adapted to provide a masking indicating output after a predetermined time interval unless at least one of the first and second sensing means generates an output signal in response to the detection of an event, and the third sensing means generates an output signal in response to the detection of an event, within the predetermined time interval.

8. A detector as claimed in claim 7, wherein when the timer is activated, if an output signal indicating a distant event is received from at least one of the sensing means the timer is re-set, and if an output signal indicating a proximate event is received from at least one of the sensing means the timer is re-set and re-started, and if no output signal is received the masking indicating output is activated.

9. A detector as claimed in claim 1, further comprising a monitoring system comprising:

a timer which is started in response to a first signal from at least one of the first and second sensing means indicating detection of an event proximate to the detector, restarted in response to subsequent detection of the first signal from at least one of the first and second sensing means, and reset in response to detection of a second signal from at least one of the first and second sensing means indicating detection of an event distant from the detector; and masking indicating means adapted to provide a masking indicating output if the timer reaches a predetermined time without being restarted.

10. A method of detecting masking of at least one of the sensing means of the detector according to claim 1, comprising detecting an event proximate the detector using at least one of the sensing means;

providing a masking indicating output after a predetermined time period, unless within the predetermined time period at least one of the sensing means detects an event.

11. A method as claimed in claim 10, comprising restarting the timer if the sensing means detects a further event within the predetermined time period.

12. A method as claimed in claim 10, comprising resetting the timer if the sensing means detects a distant event within the predetermined time period.

13. A detector comprising means to carry out a method as claimed in claim 10.

14. A computer program comprising code stored in a tangible memory for implementing a method as claimed in claim 10.

15. A non-transitory computer readable storage medium storing a computer program for implementing a method as claimed in claim 10.

* * * * *